Patented Apr. 18, 1944

2,347,032

UNITED STATES PATENT OFFICE 2,347,032

COMPOSITIONS CONTAINING A DIAMINO TRIAZINYL SUBSTITUTED ALKYL SULPHIDE

Gaetano F. D'Alelio and James W. Underwood, Pittsfield, Mass., assignors to General Electric Company, a corporation of New York No Drawing. Application May 23, 1942, Serial No. 444,263

20 Claims. (Cl. 260—42)

This invention relates to the production of new materials and more particularly is concerned with synthetic compositions of particular utility in the plastics and coating arts and which contain, or are produced from, diamino triazinyl halogeno carboxy-, carboaliphaticoxy- or carboaromaticoxy-alkyl sulphides.

The triazine derivatives used in carrying the present invention into effect may be represented by the following general formula:

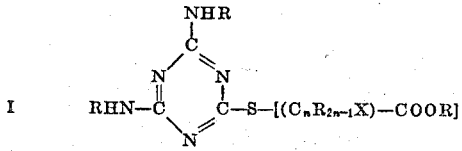

In the above formula $n$ represents an integer and is at least 1 and not more than 2, X represents a halogen atom, more particularly a chlorine, bromine, fluorine or iodine atom, and R represents a member of the class consisting of hydrogen and monovalent hydrocarbon and substituted hydrocarbon radicals, more particularly halo-hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in the —NHR groupings of Formula I is hydrogen and the R in the —COOR grouping is either hydrogen or an unsubstituted monovalent hydrocarbon radical, e. g., an aliphatic radical such as methyl, ethyl, propyl, butyl, pentyl, hexyl, allyl, methallyl, crotyl, etc. However, there also may be used in carrying the present invention into effect chemical compounds such, for instance, as those represented by the general formulas:

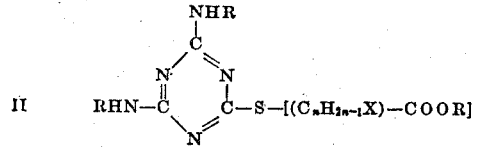

and, more particularly,

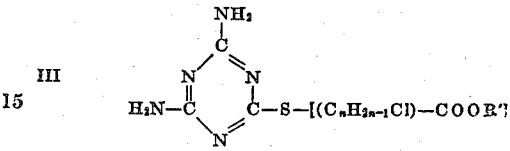

and

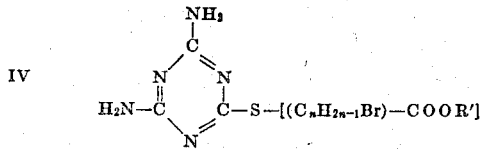

where $n$, X and R have the same meanings as given above with respect to Formula I and R' (Formulas III and IV) represents hydrogen or an unsubstituted hydrocarbon radical, numerous examples of which have been given above.

Instead of the symmetrical triazines (s-triazines) represented by the above formulas, corresponding derivatives of the asymmetrical or of the vicinal triazines may be used.

The triazine derivatives used in carrying the present invention into effect are more fully described and are specifically claimed in our copending application Serial No. 444,264, Patent No. 2,335,045 issued Nov. 23, 1943, filed concurrently herewith and assigned to the same assignee as the present invention. As pointed out in this copending application, a suitable method of preparing such triazine derivatives comprises effecting reaction in the presence of a hydrohalide acceptor, e. g., an alkali-metal hydroxide, between equimolecular proportions of a mercapto diamino [(—NHR)₂] s-triazine and a carboxy-, carboaliphaticoxy- or carboaromaticoxy-alkyl dihalide. When a carboxy (—COOH) alkyl dihalide is used as a starting reactant and the proportions of reactants and reaction conditions are such that the hydrogen atom of the —COOH grouping is replaced by the residue of the hydrohalide acceptor, e. g., by an alkali metal, the carboxy compound desired as a final product is obtained by treating this intermediate product with hydrochloric, hydrobromic, sulphuric or other suitable organic or inorganic acid in an amount just sufficient to form the desired carboxy derivative.

Examples of triazine derivatives embraced by Formula I and which may be employed in producing the compositions of this invention are listed below:

The diamino s-triazinyl halogeno carboaliphaticoxy-methyl sulphides, including the diamino s-triazinyl chloro carboaliphaticoxy - methyl sulphides, the diamino s-triazinyl bromo carboaliphaticoxy-methyl sulphides, the diamino s-triazinyl iodo carboaliphaticoxy-methyl sulphides and the diamino s-triazinyl fluoro carboaliphaticoxy-methyl sulphides, more particularly the diamino s-triazinyl halogeno (e. g., chloro, bromo, etc.) alkoxy (e. g., methoxy, ethoxy, propoxy, butoxy, etc.)-methyl sulphides.

The diamino s-triazinyl halogeno carboaroxy-methyl sulphides, more particularly the diamino s-triazinyl chloro carboaroxy-methyl sulphides, the diamino s-triazinyl bromo carboaroxy-methyl sulphides, the diamino s-triazinyl iodo carboaroxy-methyl sulphides and the diamino s-triazinyl fluoro carboaroxy-methyl sulphides The diamino s-triazinyl halogeno (chloro, bromo, iodo, fluoro) carboxy-ethyl sulphides The diamino s-triazinyl halogeno (chloro, bromo, iodo, fluoro) carboxy-methyl sulphides The diamino s-triazinyl halogeno (chloro, bromo, iodo, fluoro) carboaliphaticoxy (e. g., carboalkoxy)-ethyl sulphides The diamino s-triazinyl halogeno (chloro, bromo, iodo, fluoro) carboaroxy (e. g., carbophenoxy, carbotoloxy, etc.)-ethyl sulphides 4,6-diamino s-triazinoyl-2 alpha-(alpha-chloro carbomethoxy-ethyl) sulphide 4,6-diamino s-triazinyl-2 beta-(beta-bromo carboethoxy-ethyl) sulphide 4,6-diamino s-triazinyl-2 alpha-(beta-chloro carbopropoxy-ethyl) sulphide 4,6-diamino s-triazinyl-2 beta-(alpha-chloro carboethoxy-ethyl) sulphide 4,6-di-(methylamino) s-triazinyl-2 bromo carbobutoxy-methyl sulphide 4,6-diamino s-triazinyl-2 alpha-(alpha-chloro carbophenoxy-ethyl) sulphide 4,6-diamino s-triazinyl-2 beta-(beta-bromo carbophenoxy-ethyl) sulphide 4,6-diamino s-triazinyl-2 alpha-(beta-chloro carbophenoxy-ethyl) sulphide 4,6-diamino-s-triazinyl-2 beta-(alpha-bromo carbophenoxy-ethyl) sulphide 4,6-diamino s-triazinyl-2 alpha-(alpha-chloro carbophenoxy-propyl) sulphide 4,6-di-(anilino) s-triazinyl-2 alpha-(alpha-iodo carbophenoxy-propyl) sulphide 4,6-di-(cyclopentylamino) s-triazinyl-2 alpha-(gamma-phenyl alpha-chloro carbonaphthoxy-propyl) sulphide 4-ethylamino 6-amino s-triazinyl-2 beta-(beta-chloro carbotoloxy-ethyl) sulphide 4-isobutylamino 6-neopentylamino s-triazinyl-2 beta-(alpha-phenyl beta-naphthyl beta-iodo carbobenzoxy-ethyl) sulphide 4-naphthylamino 6-amino s-triazinyl-2 beta-(beta-isobutyl beta-bromo carbo-xyloxy-ethyl) sulphide 4-benzylamino 6-toluido s-triazinyl-2 beta-(alpha-tolyl alpha-cyclopentyl beta-chloro carbophenethoxy-propyl) sulphide 4-phenethylamino 6-xylidino s-triazinyl-2 alpha-(alpha-phenethyl beta-phenyl beta-bromo carbocyclopentoxy-ethyl) sulphide 4-chlorobenzylamino 6-anilino s-triazinyl-2 alpha-(alpha, beta-diethyl beta-chloro carbocyclohexoxy-butyl) sulphide 4,6-diamino s-triazinyl-2 alpha-(alpha-chloro carboxy-ethyl) sulphide 4,6-diamino s-triazinyl-2 beta-(beta-bromo carboxy-ethyl) sulphide 4,6-diamino s-triazinyl-2 alpha-(beta-chloro carboxy-ethyl) sulphide 4,6-diamino s-triazinyl-2 beta-(alpha-bromo carboxy-ethyl) sulphide 4-cyclopentenylamino 6-xylidino s-triazinyl-2 beta-(alpha-chloro beta-benzyl carboethoxy-propyl) sulphide 4-amino 6-methylamino s-triazinyl-2 alpha-(beta-chlorophenyl beta-chloro carboethoxy-ethyl) sulphide 4-amino 6-methylamino s-triazinyl-2 chloro carboxy-methyl sulphide 4,6-di-(ethylamino) s-triazinyl-2 bromo carboxy-methyl sulphide 4,6-di-(anilino) s-triazinyl-2 chloro carboxy-methyl sulphide 4,6-di-(bromoanilino) s-triazinyl-2 chloro carboxy-methyl sulphide 4,6 - di -(chlorocyclohexenylamino) s-triazinyl-2 bromo carboxy-methyl sulphide Additional examples of triazine derivatives embraced by Formula I that may be used in practicing the present invention are given in our above-identified copending application Serial No. 444,264.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and triazine derivatives of the kind represented by Formula I, numerous examples of which have been given above and in the aforementioned copending application. These new reaction products are not only valuable in themselves, but find particular utility when incorporated into an acid-curing thermosetting resin, for example acid-curing, thermosetting phenoplasts and aminoplasts. For instance, we may add a soluble, fusible aldehyde-reaction product of a triazine derivative such as embraced by Formula I to an acid-curing thermosetting resin and heat the resulting mixture. The aldehyde-triazine derivative reaction product accelerates the curing of the acid-curing thermosetting resin to an insoluble, infusible state. Or, we may cause the triazine derivative itself to react with the acid-curing thermosetting resin and thus accelerate the curing of the resin. Or, we may form a rapidly curing resin by effecting reaction between ingredients comprising (1) a triazine derivative of the kind embraced by Formula I, (2) an aldehyde, and (3) a phenol (including phenol itself, cresols, xylenols, etc.), or an amino or amido compound (including imino and imido compounds), e. g., aminotriazoles, aminodiazines, urea, thiourea, dicyandiamide, melamine, etc.

The resin syrups and molding compositions of this invention may be stored for long periods of time without material alteration. In marked contrast the prior acid-curing thermosetting resins, more particularly those containing direct or active curing catalysts such as inorganic acids.

e. g., hydrochloric, phosphoric, sulphuric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In carrying the present invention into effect the condensation between the reactants may be effected under acid, alkaline or neutral conditions at normal or at elevated temperatures. Any substance or catalyst which has an alkaline or an acid nature may be used to obtain the acid, alkaline or neutral condition, as for example, ammonia, sodium hydroxide, calcium hydroxide, methyl amine, diethyl amine, tributyl amine, ethanol amines, tri-isopropanol amine, etc.; mixtures of such alkaline substances; inorganic or organic acids such as hydrochloric, sulphuric, phosphoric, acetic, acrylic, crotonic, malonic, etc.; mixtures of such acids; acid salts such as sodium acid sulphate, monosodium phosphate, monosodium phthalate, etc.; basic salts such as ammonium carbonate, potassium carbonate, sodium acetate, etc.; or mixtures of such salts.

We may condense the components used in practicing this invention under various conditions. For example, all the components may be mixed together and the reaction caused to proceed under acid, alkaline or neutral conditions. Or, we may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, 2,4,6-triamino pyrimidine, etc., and an aldehyde), add the diamino triazinyl halogeno carboxy (or carboaliphaticoxy or carboaromaticoxy) alkyl sulphide thereto and effect further condensation. Or, we may first partially condense the diamino triazinyl sulphide with a molecular excess of an aldehyde under acid, alkaline or neutral conditions and then add thereto at least one other aldehyde-reactable organic compound, e. g., a phenol, a urea, aniline, etc., and effect further condensation. Also, we may separately partially condense a triazine derivative of the kind embraced by Formula I and a different aldehyde-reactable organic compound with an aldehyde and then mix the two products of partial condensation and effect further condensation therebetween. The components of each reaction product may be initially condensed under acid, alkaline or neutral conditions.

Still other ways may be employed in combining the components and in producing the unmodified and modified condensation products of this invention, as readily will be understood by those skilled in the art as the description of the invention proceeds. These condensation reactions may be carried out under a wide variety of time, pressure and temperature conditions. The temperature of reaction may vary from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

*Example 1*

| | Parts |
|---|---|
| Urea | 30.0 |
| Aqueous solution of formaldehyde (approx. 37.1% HCHO) | 65.0 |
| Aqueous ammonia (approx. 28% NH₃) | 3.0 |
| Aqueous solution of sodium hydroxide (0.46 N) | 1.6 | were mixed together to yield a solution which is described in the following formula as "urea solution":

| | Parts |
|---|---|
| Urea solution | 80.0 |
| Diamino s-triazinyl chloro carbomethoxyethyl sulphide | 0.4 |

These ingredients were heated together under reflux at the boiling temperature of the mass for 13 minutes. A molding (moldable) composition was made from the resulting resinous syrup by mixing therewith 23 parts alpha cellulose in flock form and 0.2 part of a mold lubricant, specifically zinc stearate. The wet molding compound was dried at 70° C. until sufficient moisture had been removed to provide a material that could be molded satisfactorily. A sample of the dried and ground molding compound was molded for 5 minutes at 135° C. under a pressure of 3,500 pounds per square inch. A well-cured molded piece having a well-knit and homogeneous structure was obtained. It had good resistance to water, being somewhat better in this respect than products similarly made using a curing agent of the kind commonly employed in the art.

*Example 2*

The same procedure was followed as described under Example 1 with the exception that the mixture of urea, aqueous formaldehyde, aqueous ammonia and aqueous sodium hydroxide solution was refluxed for 15 minutes prior to adding the diamino s-triazinyl chloro carbomethoxyethyl sulphide. After adding the triazine derivative, refluxing was continued for an additional 5 minutes to cause the triazine derivative to intercondense with the urea-formaldehyde partial condensation product. A molding compound and molded article were prepared as described under Example 1. The molded piece was well cured. It had good water resistance as shown by the fact that it absorbed only 4.0 per cent by weight of water when immersed in boiling water for 15 minutes, followed by immersion in cold water for 5 minutes.

*Example 3*

The same procedure was followed as described under Example 1 with the exception that the mixture of urea, aqueous formaldehyde, aqueous ammonia and aqueous solution of sodium hydroxide was refluxed for 20 minutes. The curing agent was added to the resulting resinous syrup, which thereafter was made into a molding compound as described under Example 1. A well-cured molded piece having good water resistance was produced by molding a sample of the dried and ground molding compound under the same time, pressure and temperature conditions mentioned under Example 1.

Example 4

Same as Example 1 with the exception that diamino s-triazinyl bromo carbomethoxy-ethyl sulphide was employed and the mixed components were heated together under reflux at the boiling temperature of the mass for 20 minutes instead of 13 minutes as described under Example 1. A well-cured molded piece having water-resistance characteristics and other properties much the same as the molded article of Example 1 was obtained.

Example 5

Same as Example 3 with the exception that diamino s-triazinyl bromo carbomethoxy-ethyl sulphide was used instead of the corresponding chloro derivative. In this case, too, a well-cured molded piece having good resistance to water was obtained.

Example 6

| | Parts |
|---|---|
| Thiourea | 51.0 |
| Aqueous formaldehyde (approx. 37.1% HCHO) | 90.0 |
| Aqueous ammonia (approx. 28% NH₃) | 5.1 |
| Aqueous solution of sodium hydroxide (0.46 N) | 3.3 |
| Diamino s-triazinyl chloro carbomethoxy-ethyl sulphide | 2.5 | were heated together under reflux at the boiling temperature of the mass for 20 minutes. The resulting resinous syrup was mixed with 51 parts alpha cellulose and 0.4 part zinc stearate to form a molding compound. The wet molding composition was dried at 70° C. as described under Example 1. A sample of the dried and ground molding compound was molded for 5 minutes at 135° C. under a pressure of 3,500 pounds per square inch. The molded piece was well cured throughout and had a homogeneous and well-knit structure. It had very good resistance to water as shown by the fact that it absorbed only 2.5% by weight of water when tested for its water-resistance characteristics as described under Example 2. The molding compound showed good plastic flow during molding.

Example 7

| | Parts |
|---|---|
| Thiourea | 51.0 |
| Aqueous formaldehyde (approx. 37.1% HCHO) | 77.0 |
| Aqueous ammonia (approx. 28% NH₃) | 5.1 |
| Aqueous solution of sodium hydroxide (0.46 N) | 3.3 |
| Diamino s-triazinyl chloro carbomethoxy-ethyl sulphide | 2.3 | were heated together under reflux at the boiling temperature of the mass for 30 minutes. A molding compound was made from the resulting resinous syrup by mixing therewith 51 parts alpha cellulose and 0.4 part zinc stearate. The resulting wet molding composition was dried and molded as described under Example 6. The molded piece was well cured and absorbed only 2.4% by weight of water when tested for its water-resistance characteristics as described under Example 2.

Example 8

| | Parts |
|---|---|
| Melamine | 25.2 |
| Aqueous formaldehyde (approx. 37.1% HCHO) | 48.6 |
| Aqueous ammonia (approx. 28% NH₃) | 2.6 |
| Aqueous solution of sodium hydroxide (0.46 N) | 2.0 | were heated together under reflux at the boiling temperature of the mass for 1 minute, yielding a solution which is described in the following formula as "melamine-formaldehyde solution":

| | Parts |
|---|---|
| Melamine-formaldehyde solution | 80.0 |
| Diamino s-triazinyl chloro carbomethoxy-ethyl sulphide | 0.6 |

The melamine-formaldehyde solution was heated under reflux for an additional 18 minutes, after which the triazine derivative was added and refluxing was continued for an additional 2 minutes. The resulting resinous syrup was mixed with 23 parts alpha cellulose and 0.2 part zinc stearate to form a molding compound. The wet molding composition was dried and molded as described under Example 1 with the exception that a molding time of only 3 minutes was employed. The molded piece was well cured throughout and had excellent resistance to water as shown by the fact that it absorbed only 0.26% by weight of water when tested for its water-resistance characteristics as described under Example 2. The molding compound showed good plastic flow during molding.

Example 9

The same procedure was followed as described under Example 8 with the exception that the diamino s-triazinyl chloro carbomethoxy-ethyl sulphide was not refluxed with the melamine-formaldehyde solution but was added to the solution (resinous syrup) at the same time that the alpha cellulose was added. The molded product of this example was well cured but was not quite so resistant to water as the corresponding product of Example 8. It had a water-absorption value of 0.58%.

Example 10

The same procedure was followed as described under Example 8 with the exception that 0.6 part diamino s-triazinyl bromo carbomethoxy-ethyl sulphide was used instead of the corresponding chloro derivative. The molded piece was well cured and had other properties which were much the same as the molded article of Example 8.

Example 11

| | Parts |
|---|---|
| Diamino s-triazinyl chloro carbomethoxy-ethyl sulphide | 52.6 |
| Aqueous formaldehyde (approx. 37.1% HCHO) | 252.6 | were heated together under reflux at the boiling temperature of the mass for 3 minutes. When a sample of the resulting reaction product was heated on a 150° C. hotplate, it was converted into a solid resin which cured slowly at this temperature. A molding compound was prepared by mixing together equal parts by weight of the soluble, fusible resinous reaction product and alpha cellulose. This compound was molded for 5 minutes at 140° C. under a pressure of 9,000 pounds per square inch, yielding a well-cured molded piece.

Example 12

| | Parts |
|---|---|
| Diamino s-triazinyl bromo carbomethoxyethyl sulphide | 30.9 |
| Aqueous formaldehyde (approx. 37.1% HCHO) | 110.0 | were heated together under reflux at the boiling temperature of the mass for 3 minutes. A solid resin that cured readily with good flow characteristics was obtained by heating a sample of the resulting reaction product on a 150° C. hotplate. A well-molded product was obtained by mixing the soluble, fusible resinous reaction product with an equal weight of alpha cellulose, followed by molding for 5 minutes at 140° C. under a pressure of 9,000 pounds per square inch.

Example 13

A syrupy phenolic resin was prepared from the following components:

| | Parts |
|---|---|
| Phenol (freshly distilled) | 180.0 |
| Aqueous formaldehyde (approx. 37.1% HCHO) | 390.0 |
| Sodium carbonate (anhydrous) | 4.4 |

The above ingredients were heated together with constant stirring for 2½ hours at a temperature of 85–90° C. A slightly exothermic reaction caused the temperature to rise for a brief period to 96° C. The syrupy condensation product prepared in this manner is described in the following formula as "syrupy phenolic resin":

| | Parts |
|---|---|
| Syrupy phenolic resin | 30.0 |
| Diamino s-triazinyl chloro carbomethoxyethyl sulphide | 2.72 |
| Glycerine | 2.0 |

These ingredients were mixed together and the resulting mixture then was dehydrated under a reduced pressure of approximately 55 mm. mercury. During the dehydration period the resin temperature reached 60° C. When almost all the water had been removed in this manner, the molasses-like casting resin thereby obtained was poured into a container. The resin was heated in this container for about 48 hours at 70° C. The resin cured to an insoluble and infusible state. It was hard, smooth, homogeneous, fairly light in color and opaque. This later characteristic was due mainly to the fact that the liquid resin had not been dehydrated sufficiently. The dispersion of water through the solid resin caused the opaque effect as evidenced by the fact that at the surface where the water could escape the solid resin was clear.

Example 14

| | Parts |
|---|---|
| Syrupy phenolic resin of Example 13 | 30.0 |
| Diamino s-triazinyl bromo carbomethoxyethyl sulphide | 3.09 |
| Glycerine | 2.0 |

The same procedure was followed as described under Example 13, yielding a casting resin having substantially the same properties as the corresponding product of Example 13.

Example 15

| | Parts |
|---|---|
| Urea | 30.0 |
| Aqueous formaldehyde (approx. 37.1% HCHO) | 67.0 |
| Aqueous ammonia (approx. 28% NH₃) | 3.5 |
| Aqueous solution of sodium hydroxide (0.5 N) | 1.6 | were heated together under reflux at the boiling temperature of the mass for 20 minutes, yielding a resinous syrup that is identified in the following formula as "urea-formaldehyde syrup":

| | Parts |
|---|---|
| Urea-formaldehyde syrup | 102.0 |
| Reaction product of Example 11 | 11.0 |

These components were heated together under reflux at the boiling temperature of the mass for 4 minutes. The resulting resinous syrup was mixed with 34 parts alpha cellulose and 0.2 part zinc stearate to form a molding composition. The wet molding compound was dried at room temperature until sufficient moisture had been removed to provide a material that could be molded satisfactorily. A sample of the dried and ground molding compound was molded for 5 minutes at 140° C. under a pressure of 6,750 pounds per square inch. A well-cured molded piece having a well-knit and homogeneous structure was obtained. The molding compound showed good plastic flow during molding.

Example 16

| | Parts |
|---|---|
| Urea-formaldehyde syrup of Example 15 | 102.0 |
| Reaction product of Example 12 | 9.06 | were heated together under reflux at boiling temperature for 2 minutes. A molding compound was prepared by mixing the resulting resinous syrup with 34 parts alpha cellulose and 0.2 part zinc stearate. The wet molding composition was dried as described under Example 15. A sample of the dried and ground molding compound was molded for 4 minutes at 140° C. under a pressure of 10,000 pounds per square inch. A well-cured molded piece having good resistance to water was obtained. The water-absorption value of the molded article was only 3.9%, following the test method described under Example 2. The plasticity of the molding compound during molding was not quite so good as that of the molding compound of Example 15.

Example 17

| | Parts |
|---|---|
| Melamine | 32.0 |
| Aqueous formaldehyde (approx. 37.1% HCHO) | 61.0 |
| Aqueous ammonia (approx. 28% NH₃) | 1.5 |
| Aqueous solution of sodium hydroxide (0.5 N) | 1.25 | were heated together under reflux at the boiling temperature of the mass for 15 minutes, yielding a resinous syrup that is identified in the following formula as "melamine-formaldehyde syrup":

| | Parts |
|---|---|
| Melamine-formaldehyde syrup | 96.0 |
| Reaction product of Example 11 | 5.7 |

These components were heated together under reflux at the boiling temperature of the mass for 2 minutes. A molding compound was prepared by mixing 32 parts alpha cellulose and 0.2 part zinc stearate with the resulting resinous syrup. This compound was dried and molded as described under Example 16 with the exception that a molding time of 3 minutes and a molding pressure of 9,000 pounds per square inch were employed. A well-cured molded piece having excellent resistance to water was obtained, as evidenced by the fact that it absorbed only 0.44% by weight of water when tested for its water-resistance characteristics as described under Example 2.

*Example 18*

| | Parts |
|---|---|
| Melamine-formaldehyde syrup of Example 17 | 96.0 |
| Reaction product of Example 12 | 4.5 | were heated together under reflux at the boiling temperature of the mass for 3 minutes. A molding compound was prepared in the same manner as described under Example 17. The conditions of molding also were the same as set forth under Example 17. The molded piece was well cured and showed excellent resistance to water, absorbing only 1.0% by weight of water when tested for its water-resistance characteristics as described under Example 2. The molding compounds of this example and of the preceding example showed approximately the same good plastic flow characteristics during molding.

*Example 19*

| | Parts |
|---|---|
| Dimethylol urea (commercial grade containing approx. 11% by weight of water) | 60.0 |
| Aqueous ammonia (approx. 28% NH₃) | 3.5 |
| Aqueous solution of sodium hydroxide (0.5 N) | 1.6 |
| Water | 42.0 | were heated together under reflux at the boiling temperature of the mass for 20 minutes, yielding a resinous syrup that is identified in the following formula as "dimethylol urea syrup":

| | Parts |
|---|---|
| Dimethylol urea syrup | 107.0 |
| Reaction product of Example 11 | 11.0 |

These components were heated together under reflux at the boiling temperature of the mass for 5 minutes. The resulting resinous syrup was mixed with 36 parts alpha cellulose and 0.2 part zinc stearate to form a molding compound. The wet molding compound was dried and molded as described under Example 15 with the exception that a molding pressure of 11,250 pounds per square inch was employed. A well-molded product which was not so resistant to water as the molded piece of Example 15 was obtained. The plasticity of the compound during molding was approximately the same as that of the molding compound of Example 15. Likewise, the molded article had about the same cohesive characteristics and the same evenness of structure as the molded article of Example 15.

*Example 20*

| | Parts |
|---|---|
| Dimethylol urea syrup | 107.0 |
| Reaction product of Example 12 | 9.0 | were heated together under reflux at the boiling temperature of the mass for 5 minutes. The resulting resinous syrup was mixed with alpha cellulose and zinc stearate to form a molding compound in exactly the same manner as described under Example 19. A sample of the dried and ground molding compound was molded for 4 minutes at 140° C. under a pressure of 6,750 pounds per square inch. The molded article was well cured and had approximately the same cohesive characteristics as the molded article of Example 19. The molding compound of this example showed slightly better flow characteristics during molding than the molding compound of Example 19.

*Example 21*

| | Parts |
|---|---|
| Trimethylol melamine (crystalline) | 43.0 |
| Aqueous ammonia (approx. 28% NH₃) | 1.2 |
| Aqueous solution of sodium hydroxide (0.5 N) | 1.0 |
| Water | 30.4 | were heated together under reflux at the boiling temperature of the mass for 5 minutes, yielding a resinous syrup that is identified in the following formula as "trimethylol melamine syrup":

| | Parts |
|---|---|
| Trimethylol melamine syrup | 76.0 |
| Reaction product of Example 11 | 5.7 |

To the mixture of the above components was added 25 parts alpha cellulose and 0.1 part zinc stearate to form a molding compound. The wet molding composition was dried and molded as described under Example 19 with the exception that a molding pressure of 11,400 pounds per square inch was employed. The molded article was well cured and had very good resistance to water, as shown by the fact that it absorbed only 0.77% by weight of water when tested for its water-resistance characteristics as described under Example 2. The molded article had approximately the same evenness of structure as the molded articles of Examples 15 and 17 to 20, inclusive. The plastic flow of the compound during molding was slightly less than that of the molding compound of Example 19.

*Example 22*

| | Parts |
|---|---|
| Trimethylol melamine syrup of Example 21 | 76.0 |
| Reaction product of Example 12 | 4.5 | were heated together under reflux at the boiling temperature of the mass for one-half minute. The resulting resinous syrup was mixed with 25 parts alpha cellulose and 0.1 part zinc stearate to form a molding compound. The wet molding composition was dried and molded as described under Example 21 with the exception that a molding time of 3 minutes and a molding pressure of 8,000 pounds per square inch were employed. The molded article was very well cured and had excellent resistance to water, as evidenced by the fact that it absorbed only 0.65% by weight of water when tested for its water-resistance characteristics as described under Example 2. The plastic flow of the molding compound of this example was not so good as that of the molding compounds of the previous examples.

*Example 23*

| | Parts |
|---|---|
| 1-phenyl guanazole | 35.0 |
| Aqueous formaldehyde (approx. 37.1% HCHO) | 32.4 |
| Aqueous ammonia (approx. 28% NH₃) | 1.2 |
| Aqueous solution of sodium hydroxide (0.5 N) | 0.8 |
| Reaction product of Example 11 | 11.0 | were heated together in an open reaction vessel for 3 minutes, at the end of which period of time separation of a resinous mass took place. The reaction mixture was mixed with 23 parts alpha cellulose and 0.1 part zinc stearate to form a molding compound. The wet molding composition was dried and molded as described under Example 21 with the exception that a molding pressure of only 5,600 pounds per square inch was employed. The molded article was well cured and absorbed only 1.26% by weight of water when tested for its water-resistance characteristics as described under Example 2. The plasticity of the molding compound during molding was somewhat better than that of any of the preceding examples. The molded article showed approximately the same cohesive characteristics and evenness of structure as the molded pieces of, for instance, Examples 15, 18 and 19.

*Example 24*

| | Parts |
|---|---|
| 1-phenyl guanazole | 35.0 |
| Aqueous formaldehyde (approx. 37.1% HCHO) | 32.4 |
| Aqueous ammonia (approx. 28% NH₃) | 1.2 |
| Aqueous solution of sodium hydroxide (0.5 N) | 0.8 |
| Reaction product of Example 12 | 9.0 | were heated together in an open reaction vessel for 2 minutes, at the end of which period of time a milky, insoluble resin formed. The reaction mixture was made into a molding compound as described under Example 23. The wet molding composition was dried and molded likewise as described under Example 23 with the exception that a molding pressure of 6,750 pounds per square inch was employed. The molded article was well cured and absorbed only 1.02% by weight of water when tested for its water-resistance characteristics as described under Example 2. The plasticity of the molding compound was not quite so good as that of Example 23, being approximately the same as that of the molding compounds of, for instance, Examples 17, 18 and 19. In all other respects the molded article of this example was much the same as the molded article of Example 23.

It will be understood, of course, by those skilled in the art that the reaction between the components may be effected at temperatures ranging, for example, from room temperature to the fusion or boiling temperature of the mixed reactants, the reaction proceeding more slowly at normal temperatures than at elevated temperatures in accordance with the general law of chemical reactions. Thus, instead of effecting reaction between the ingredients of the above examples under reflux at boiling temperature as mentioned in the individual examples, the reaction between the components may be carried out at temperatures ranging, for example, from room temperature up to the boiling temperature of the mass using substantially longer reaction periods. For instance, instead of heating the components of Examples 11 and 12 under reflux for a few minutes to effect reaction therebetween, the reaction mixture may be shaken for a prolonged period, for example 24 to 72 hours or longer at room temperature (20°–30° C.) to effect reaction the components and to obtain a soluble, fusible reaction product.

It will also be understood by those skilled in the art that our invention is not limited to condensation products obtained by reaction of ingredients comprising an aldehyde and the specific halogen compound named in the above illustrative examples. Thus, instead of using diamino s-triazinyl chloro carbomethoxy-ethyl sulphide or diamino s-triazinyl bromo carbomethoxy-ethyl sulphide we may use, for example, other diamino s-triazinyl halogeno carboaliphaticoxy-ethyl (or carboxy-ethyl or carboaromaticoxy-ethyl) sulphides (e. g., a diamino s-triazinyl iodo carboalkoxy-ethyl sulphide, a diamino s-triazinyl fluoro carboalkoxy-ethyl sulphide, etc.) a diamino s-triazinyl halogeno carboaromaticoxy-ethyl sulphide (e. g., a diamino s-triazinyl chloro carbophenoxy-ethyl sulphide, a diamino s-triazinyl bromo carbophenoxy-ethyl sulphide, etc.), a diamino s-triazinyl halogeno (chloro, bromo, fluoro, iodo) carboxy-ethyl sulphide, a diamino s-triazinyl halogeno carboxy-, carboaliphaticoxy- or carboaromaticoxy-methyl sulphide, or any other halogen compound (or mixture thereof) embraced by Formula I, numerous specific examples of which have been given hereinbefore.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, heptaldehyde, octaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-methylol derivatives of urea, thiourea, selenourea and iminourea (numerous examples of which are given in D'Alelio copending application Serial No. 377,524, filed February 5, 1941), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Particularly good results are obtained with active methylene-containing bodies such as a methylol urea, more particularly mono- and di-methylol ureas, and a methylol melamine, more particularly monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the halogen compound may be varied over a wide range depending, for example, upon the particular properties desired in the final product and the particular halogen compound used as a starting reactant. Thus, we may use, for example, from 0.5 to 8 or 9 or more mols of an aldehyde for each mol of the halogen compound. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example from 1 to 15 or 20 or more mols of such alkylol derivative for each mol of the halogen compound.

When the halogen compound of the kind embraced by Formula I is used primarily as an intercondensable curing reactant for accelerating the conversion of acid-curing thermosetting resins to an insoluble, infusible state, only a relatively small amount of the halogen compound ordinarily is required, for example an amount corresponding to from 0.2 or 0.3% to 5 or 6% by weight of the resin to be cured, calculated on the basis of the dry resin. In some cases it may be desirable to use higher amounts, for instance up to 8 or 9 or more parts by weight of the halogen compound per 100 parts (net dry) of the acid-curing thermosetting resin. When the halogen compound of the kind embraced by Formula I is incorporated into the acid-curing thermosetting resin in the form of a soluble, fusible aldehyde-reaction product thereof, then higher amounts of such reaction product ordinarily are used as compared with the amount employed when using the halogen compound itself. The halogen compound or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the triazine derivatives embraced by Formula I or by their soluble, fusible aldehyde-reaction products, are the acid-curing phenol-aldehyde resins, melamine-formaldehyde resins, aminotriazole-aldehyde resins, aminodiazine-aldehyde resins, urea-aldehyde resins, urea-melamine-formaldehyde resins, protein-aldehyde resins, e. g., casein-formaldehyde resins, aniline-aldehyde resins, resinous condensation products of aldehydes such as formaldehyde with polyamides as, for instance, malonic diamide, maleic diamide, fumaric diamide, itaconic diamide, etc. Other examples of amino or amido compounds (amidogen compounds) that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, asymmetrical diethyl urea, allyl urea, 2-chloroallyl urea, ethylidene urea, guanylurea, biguanidine, aminoguanidine, melamine, triureido melamine, ammeline, ammelide, melem, melam, melon, aminotriazoles, aminodiazines, etc. Suitable mixtures of such compounds also may be used.

Phenol itself and various substituted phenols, for example the cresols, the xylenols, etc., may be condensed with aldehydes, e. g., formaldehyde, furfural, mixtures of formaldehyde and furfural, etc., to form acid-curing thermosetting resins of the phenoplast type, and these thermosetting resins then can be cured to the insoluble, infusible state with the aid of the herein-described halogen compounds or with the soluble, fusible aldehyde-reaction products thereof.

If desired, the fundamental reaction products of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53–75, page 4, column 1, lines 1–40, which patent is assigned to the same assignee as the present invention.

Thermosetting molding compositions comprising a filler and an acid-curing thermosetting resin carrying a curing agent comprising a triazine derivative of the kind embraced by Formula I, or a soluble, fusible aldehyde-reaction product of such a triazine derivative, may be molded into a variety of shapes under heat and pressure, more particularly at temperatures of the order of 100° to 200° C., preferably from approximately 120° to 180° C. The molding compositions show good plastic flow during molding since the curing agent not only functions as such but also generally serves to impart improved plastic flow to the molding composition. Molded articles of manufacture comprising the molded, heat-hardened molding compositions of this invention have a good surface finish, show no evidence of bleeding the curing agent, are well cured throughout, and show no loss in any of their other useful properties due to the presence of the hereindescribed halogen compound or aldehyde-reaction product thereof.

What we claim as new and desire to secure by Letters Patent of the United States is:

1. A composition comprising an acid-curing, thermosetting resin carrying a curing agent therefor comprising a compound selected from the class consisting of (1) compounds corresponding to the general formula

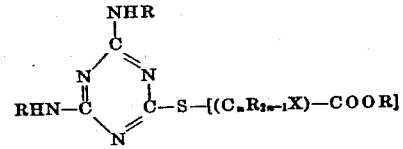

where $n$ represents an integer and is at least 1 and not more than 2, X represents a halogen atom, and R represents a member of the class consisting of hydrogen and monovalent hydrocarbon and halo-hydrocarbon radicals; and (2) soluble, fusible aldehyde-reaction products of the compounds of (1).

2. A composition comprising an acid-curing, thermosetting, phenol-aldehyde resin having incorporated therein a compound corresponding to the general formula

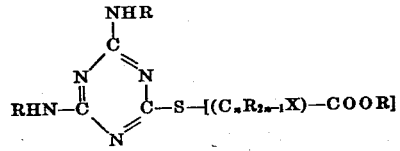

where $n$ represents an integer and is at least 1 and not more than 2, X represents a halogen atom, and R represents a member of the class consisting of hydrogen and monovalent hydrocarbon and halo-hydrocarbon radicals.

3. A composition comprising an acid-curing, thermosetting, amidogen-aldehyde resin having incorporated therein a compound corresponding to the general formula

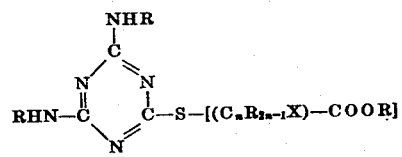

where $n$ represents an integer and is at least 1 and not more than 2, X represents a halogen atom, and R represents a member of the class consisting of hydrogen and monovalent hydrocarbon and halo-hydrocarbon radicals.

4. A composition of matter comprising the product of reaction of ingredients comprising an aldehyde and a compound corresponding to the general formula

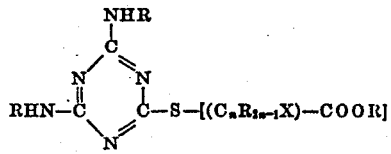

where $n$ represents an integer and is at least 1 and not more than 2, X represents a halogen atom, and R represents a member of the class consisting of hydrogen and monovalent hydrocarbon and halo-hydrocarbon radicals.

5. A composition as in claim 4 wherein the aldehyde is formaldehyde.

6. A composition comprising the product of reaction of ingredients comprising a phenol, an aldehyde and a compound corresponding to the general formula

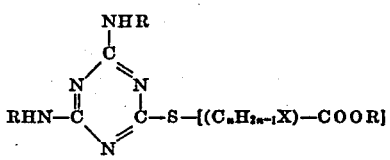

where $n$ represents an integer and is at least 1 and not more than 2, X represents a halogen atom, and R represents a member of the class consisting of hydrogen and monovalent hydrocarbon and halo-hydrocarbon radicals.

7. A composition comprising the product of reaction of ingredients comprising a urea, an aldehyde and a compound corresponding to the general formula

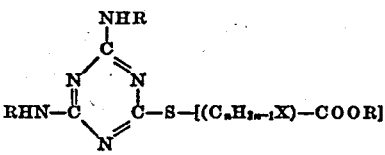

where $n$ represents an integer and is at least 1 and not more than 2, X represents a halogen atom, and R represents a member of the class consisting of hydrogen and monovalent hydrocarbon and halo-hydrocarbon radicals.

8. A heat-curable resinous condensation product of ingredients comprising urea, formaldehyde and a compound corresponding to the general formula

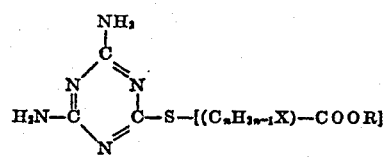

where $n$ represents an integer and is at least 1 and not more than 2, X represents a halogen atom, and R represents a member of the class consisting of hydrogen and monovalent hydrocarbon and halo-hydrocarbon radicals.

9. A product comprising the cured resinous condensation product of claim 8.

10. A condensation product of ingredients comprising an aldehyde and a compound corresponding to the general formula

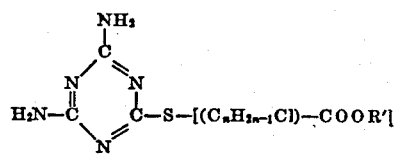

where $n$ represents an integer and is at least 1 and not more than 2, and R' represents an unsubstituted monovalent hydrocarbon radical.

11. A condensation product of ingredients comprising an aldehyde and a compound corresponding to the general formula

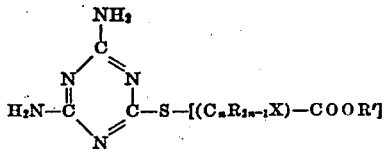

where $n$ represents an integer and is at least 1 and not more than 2, X represents a halogen atom and R' represents an unsubstituted monovalent hydrocarbon radical.

12. A composition comprising the resinous product of reaction of ingredients comprising melamine, formaldehyde and a compound corresponding to the general formula

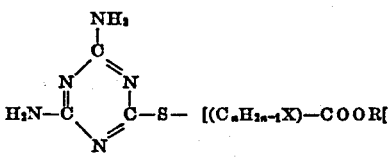

where $n$ represents an integer and is at least 1 and not more than 2, X represents a halogen atom and R represents a member of the class consisting of hydrogen and monovalent hydrocarbon and halo-hydrocarbon radicals.

13. A composition comprising the resinous product of reaction of (1) a partial condensation product of ingredients comprising a phenol and an aldehyde, and (2) a compound corresponding to the general formula

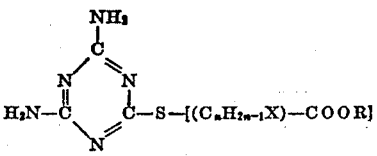

where $n$ represents an integer and is at least 1 and not more than 2, X represents a halogen atom and R represents a member of the class consisting of hydrogen and monovalent hydrocarbon and halo-hydrocarbon radicals.

14. A composition comprising the resinous product of reaction of (1) a partial condensation product of ingredients comprising a urea and an aldehyde, and (2) a compound corresponding to the general formula

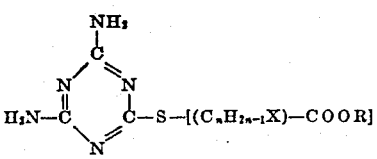

where $n$ represents an integer and is at least 1 and not more than 2, X represents a halogen atom and R represents a member of the class consisting of hydrogen and monovalent hydrocarbon and halo-hydrocarbon radicals.

15. A composition comprising the product of reaction of ingredients comprising an aldehyde and a diamino s-triazinyl halogeno carboaliphaticoxy-ethyl sulphide.

16. A resinous composition comprising the product of reaction of (1) a partial condensation product obtained by reaction, while admixed with an alkaline substance, of ingredients comprising urea and formaldehyde, and (2) a diamino s-triazinyl halogeno carboalkoxy-ethyl sulphide.

17. A resinous composition comprising the product of reaction of (1) a partial condensation product obtained by reaction, while admixed with an alkaline substance, of ingredients comprising melamine and formaldehyde, and (2) a diamino s-triazinyl halogeno carboalkoxy-ethyl sulphide.

18. A composition comprising the resinous product of reaction of ingredients comprising urea, formaldehyde and a diamino s-triazinyl chloro carbomethoxy-ethyl sulphide.

19. A composition comprising the resinous product of reaction of ingredients comprising urea, formaldehyde and a diamino s-triazinyl halogeno carbomethoxy-ethyl sulphide.

20. The method of preparing new condensation products which comprises effecting reaction between ingredients comprising an aldehyde and a compound corresponding to the general formula

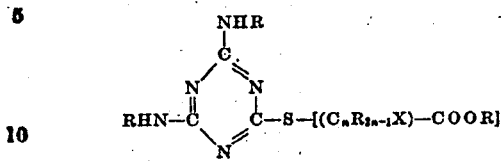

where $n$ represents an integer and is at least 1 and not more than 2, X represents a halogen atom, and R represents a member of the class consisting of hydrogen and monovalent hydrocarbon and halo-hydrocarbon radicals.

GAETANO F. D'ALELIO.
JAMES W. UNDERWOOD.

CERTIFICATE OF CORRECTION.

Patent No. 2,347,032.                                          April 18, 1944.

GAETANO F. D'ALELIO, ET AL.

It is hereby certified that error appears in the printed specification of the above numbered patent requiring correction as follows: Page 2, first column, line 40, for "triazinoyl" read --triazinyl--; page 5, first column, line 59, Example 13, for "later" read --latter--; page 7, first column, line 65, after "reaction" insert --between--; line 66, for "scoluble" read --soluble--; page 8, first column, line 48, for "guanyl-" read --guanyl--; page 9, second column, line 11, claim 11, for that portion of the formula reading "$(C_n R_{2n-1} X)$ read --$(C_n H_{2n-1} X)$--; and that the said Letters Patent should be read with this correction therein that the same may conform to the record of the case in the Patent Office.

Signed and sealed this 8th day of August, A. D. 1944.

(Seal)                                                 Leslie Frazer

Acting Commissioner of Patents.